J. P. BROPHY.
INNER TUBE FOR PNEUMATIC TIRES.
APPLICATION FILED APR. 1, 1916.
1,208,906.
Patented Dec. 19, 1916.
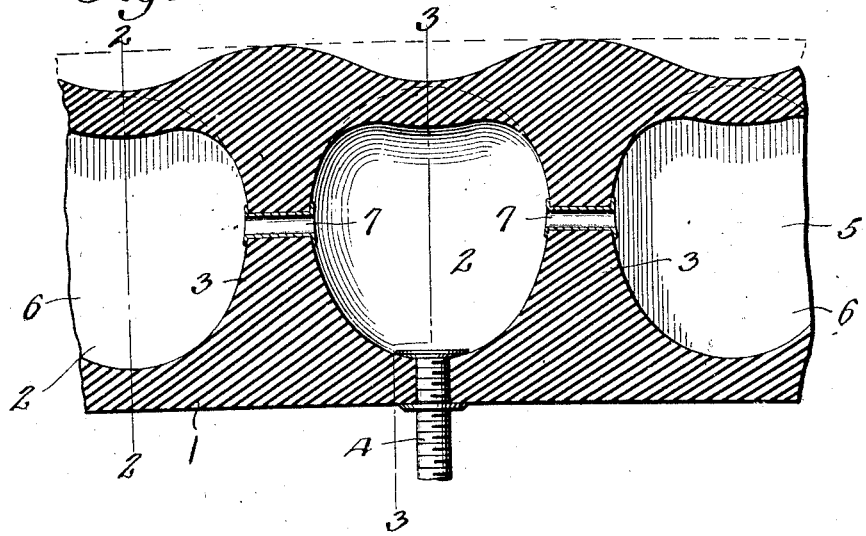
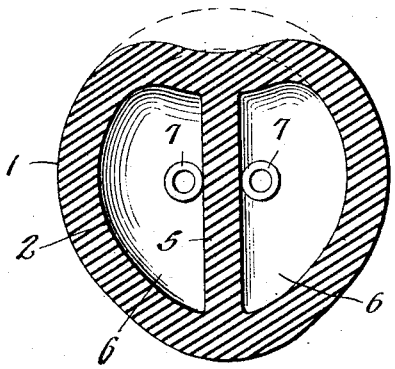
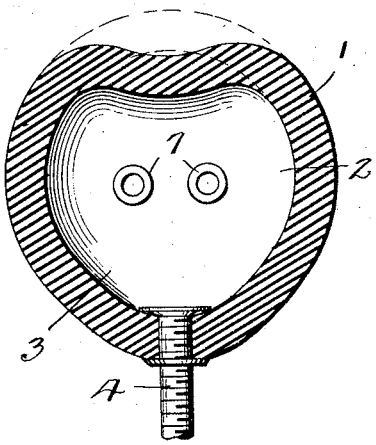
Inventor
J. P. Brophy
By Victor J. Evans
Attorney
Witnesses

UNITED STATES PATENT OFFICE.

JAMES P. BROPHY, OF BIRMINGHAM, ALABAMA.

INNER TUBE FOR PNEUMATIC TIRES.

1,208,906.   Specification of Letters Patent.   Patented Dec. 19, 1916.

Application filed April 1, 1916. Serial No. 88,318.

*To all whom it may concern:*

Be it known that I, JAMES P. BROPHY, a citizen of the United States, residing at Birmingham, in the county of Jefferson and State of Alabama, have invented new and useful Improvements in Inner Tubes for Pneumatic Tires, of which the following is a specification.

This invention relates to certain novel and useful improvements in inner tubes for pneumatic tires.

In carrying out the present invention, it is my purpose to provide an inner tube for pneumatic tires which will be constructed in such manner as to render the same practically puncture proof and which, in the event of the discharge of the air therefrom, will prevent the collapsing of the tire as a whole, thereby preventing mutilation of the tire and prolonging the life thereof when the tire is kept in service after the air has been exhausted therefrom.

With the above and other objects in view, the invention consists in the construction, combination and arrangement of parts hereinafter set forth in and falling within the scope of the claim.

In the accompanying drawing: Figure 1 is a fragmentary longitudinal sectional view through an inner tube constructed in accordance with the present invention. Fig. 2 is a cross sectional view on the line 2—2 of Fig. 1. Fig. 3 is a similar view on the line 3—3 of Fig. 1.

Referring now to the drawing in detail, 1 designates an inner tube for pneumatic tires of the double tube type. In accordance with my present invention, the tube 1 is formed interiorly to provide a circular series of air chambers 2 separated from one another by means of solid walls 3 formed of the same material as the tube and connected to the tube 1 and opening into one of the chambers 2 is an air valve 4 whereby the tube may be inflated. All of the chambers 2, with the exception of the chamber provided with the air valve 4, are divided by means of longitudinal partitions 5 into compartments 6 arranged side by side, and the compartments 6 on each side of the tire are in open communication with one another by means of metal tubes 7 passed through openings in the partitions 3 and the compartments 6 contiguous to the valve chamber are in open communication with the valve chamber by means of tubes similar to the tubes 7. The partitions 5 are made of rubber that is more resilient than the remaining parts of the tire so that such partitions may properly spread under the pressure in the tube. The outer walls of the chambers are normally concaved or depressed as illustrated in the drawing and when the tube is inflated, these walls are forced out as shown by the dotted lines in the drawing so that the outer circumference of the tube will present an unbroken tread. When, however, one of the chambers or compartments is punctured at the outer wall, such wall immediately assumes its normal position and in so doing tends to close the puncture so as to prevent the escape of all the air from the chamber or compartment.

It will be noted that the walls of the chambers are relatively thick so as to reduce the possibility of puncture to a minimum, and should the tube be punctured, and the air released therefrom, the walls of the chambers and compartments segregated from one another will act to hold the tube expanded to such an extent as to prevent mutilation of the tire when the latter is used without air.

I claim:

An inner tube for pneumatic tires formed interiorly to provide an annular series of chambers, all of said chambers ut one being divided longitudinally to form compartments arranged side by side, the compartments upon each side of the tire communicating with one another and with the other chamber, an inflation valve in the non-divided chamber, the outer walls of said chambers being normally concaved so that the rubber may be compressed upon the inflation of the tire to reduce the possibility of puncture.

In testimony whereof I affix my signature in presence of two witnesses.

JAMES P. BROPHY.

Witnesses:
G. S. WHITE,
P. J. THORNTON.